July 26, 1960

J. V. CAPUTO 2,946,934

RECTIFIER

Filed July 24, 1958

INVENTOR.
JAMES V. CAPUTO.

BY
Christy, Parmelee & Strickland

ATTORNEYS.

July 26, 1960

J. V. CAPUTO

RECTIFIER 2,946,934

Filed July 24, 1958

INVENTOR.
JAMES V. CAPUTO.
BY
Christy, Parmelee Stickler
ATTORNEYS.

INVENTOR.
JAMES V. CAPUTO.
BY
ATTORNEYS.

July 26, 1960

J. V. CAPUTO 2,946,934

RECTIFIER

Filed July 24, 1958

INVENTOR.
JAMES V. CAPUTO.
BY
Christy, Parmelee, Struckus
ATTORNEYS.

United States Patent Office 2,946,934
Patented July 26, 1960

2,946,934
RECTIFIER

James V. Caputo, Youngstown, Ohio; Alice E. Caputo, 1409 S. Meridian Road, executrix of said James V. Caputo, deceased Filed July 24, 1958, Ser. No. 750,803

21 Claims. (Cl. 317—234)

This invention is for an improvement in rectifiers and more particularly rectifiers for industrial use where the current demands are such as to require a number of diodes.

In some industrial applications requiring heavy current at low voltage, several hundred diodes are connected in parallel. Due to variations inherent in the diodes, or the circuit arrangement or other factors, great difficulty is encountered in equalizing the current flow through them. Reactors in the A.C. or primary side may provide some protection, but this is complicated and unsatisfactory. As the overload increases on any diode, its protective fuse will blow, which in turn increases the load on other diodes, resulting in a succession of fuse failures. If fuses are not used, the diodes are destroyed, or short-circuiting occurs.

The present invention has for its object to provide a unique mounting for the individual diodes designed to maintain a more nearly uniform current flow through the individual diodes and protect them from overheating.

A further object of the invention is to provide a multiple diode rectifier of unique construction, and one which is adapted to rectify multiphase or single phase currents and which may be connected in various ways.

A further object of my invention is to provide a multi diode rectifier with liquid cooling of the diode mounting, while a still further object is to provide an accessible and convenient mounting for the individual diodes. These and other objects and advantages are secured by my invention in which.

Figure 1:
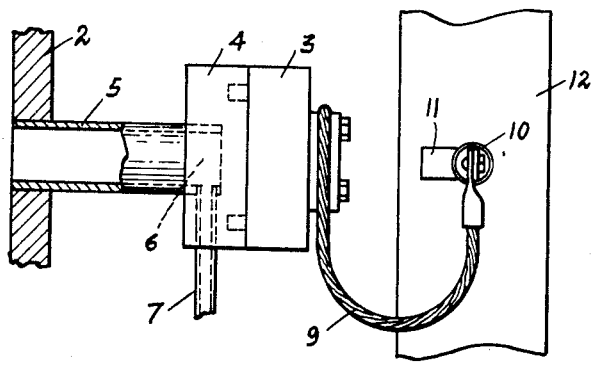
Fig. 1 is a fragmentary view of a single diode arrangement embodying my invention.
Figure 2:
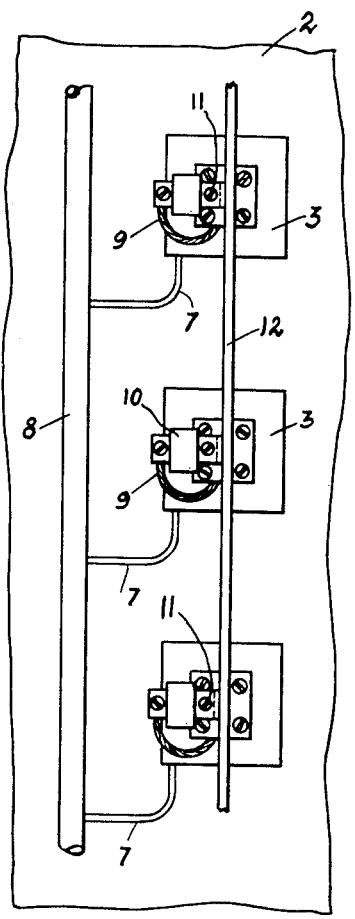
Fig. 2 is a fragmentary front elevation of a portion of a single bank of diodes mounted in the manner shown in Fig. 1.

According to the general plan of my invention, one direct current bus bar or conductor is a hollow vessel, a fragment of one wall of which is designated 2 in Figs. 1 and 2. It is made of copper or other highly conducting metal and is designed for the circulation of coolant therethrough, such as water or oil. Each diode, designated 3, is attached to a block or bracket 4 that is carried on the end of a metal tube 5, preferably of stainless steel, that is normal to the wall 2 of the vessel, and which is mounted in and opens through said wall. The block or bracket 4 has a hollow interior 6, and it is provided with a nipple 7 to which a fluid coolant supply line 8 may be connected. Thus liquid may be supplied to the block and flow through the tube and into the vessel which is kept full of liquid, and from which liquid may be withdrawn for recirculation. The diode or rectifier unit 3, which may be of any usual form, such as agermanium rectifier unit, or other type well known in the art, is cooled by contact with the block on which it is so supported. A conductor 9 connected to the diode is connected through a fuse 10 to a bracket 11 on an A.-C. bus bar 12.

This not only provides an effective and convenient mounting arrangement for large numbers of diodes in a rectifier, but each metal tube has a predetermined resistance or reactance which is effective to limit overload on any particular unit. Capable of carrying the normal expected load, the tube imposes a resistance to overloading and thereby tends to equalize the distribution of the load among the many diodes. For example, assuming a circuit with .5 voltage drop and a resistance of .00005 ohms the current according to the equation $$I = \frac{E}{R}$$

is .5/.00005–10,000 amperes. If in another circuit the resistance or impedance is .0001 and the voltage is .5, the current is 5,000 amperes, or fifty percent less. However, assuming the stainless steel tube to have a resistance of .00175 ohms, then in the first case the resistance is .00005+.00175 or .0018. Then I=.5/.0018=277 amperes. In the second case the resistance is .00010+.00175 or .00185 ohms. Then I=.5/.00185=270 amperes. Instead of the difference being 2 to 1 without the stainless steel tubes, the difference with these tubes is one of only around 2½ to 3%. Stainless steel has an electrical resistance much greater than copper, and hence is desirably used to introduce the above described equalizing effect, but other metals may also be employed. However, if several diodes are connected in series, only one of the tubes of the series would be of the higher resistance metal and others might be copper or low resistance metal.

Since the diodes are arranged in banks, which may be horizontal or vertical, and are here shown in vertical arrangement, all the metal tubes and supporting blocks on a single vessel, being at the same potential, may be connected to a common cooling manifold leading to the respective nipple 7 so that cooling fluid may be supplied to all of the diode supports and circulate into the common chamber within the vessel 2.

Figure 3:
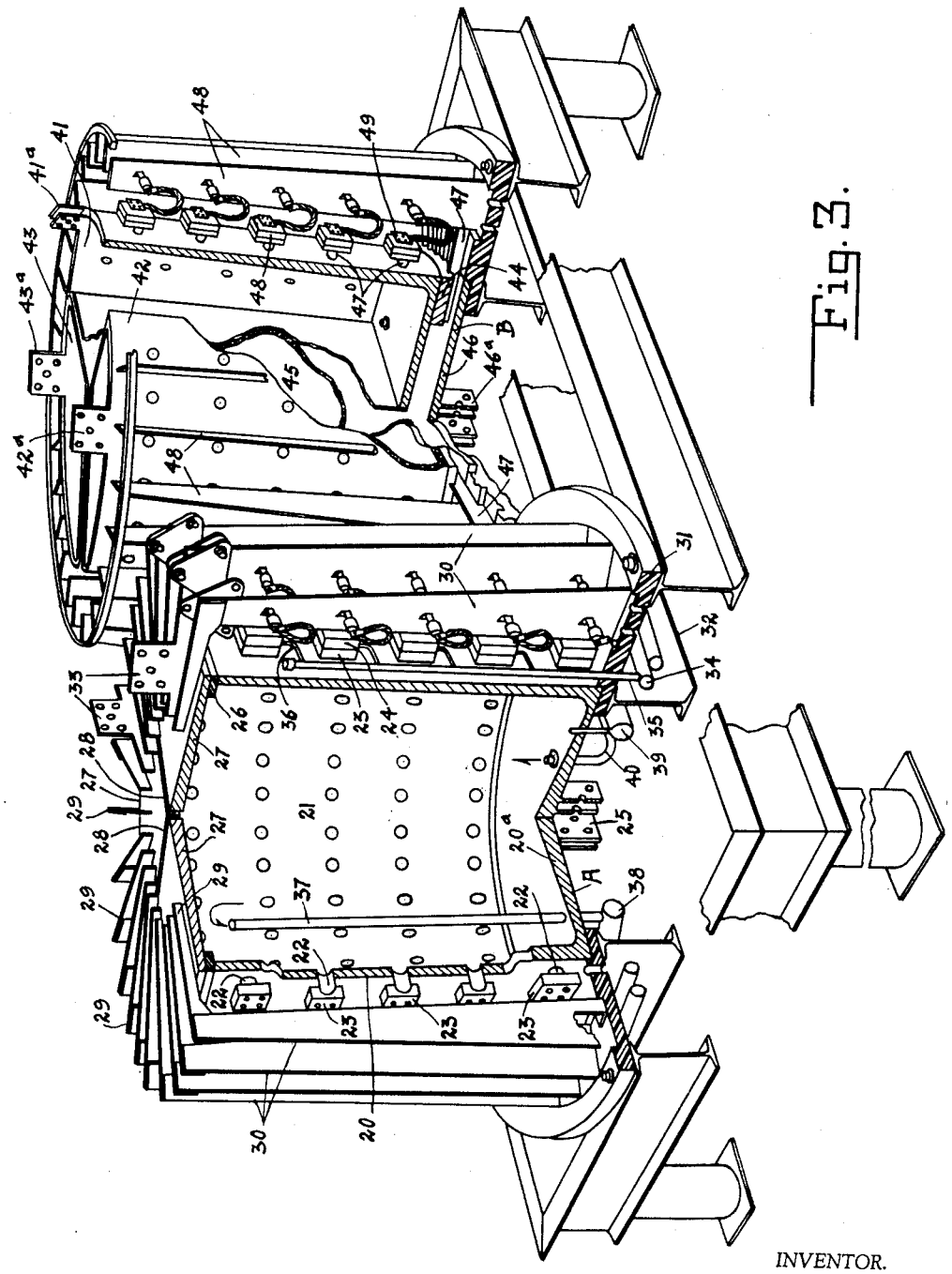
Fig. 3 is a perspective view, partly broken away of a rectifier embodying one form of my invention.

Reference may now be made to Fig. 3 showing a typical large capacity rectifier unit embodying my invention. This is shown as being comprised of two main elements A and B.

Element A comprises a metal vessel 20, corresponding to 2 in Fig. 1. It is cylindrical with radial holes 21 through the walls in which are secured stainless steel or other metal tubes 22 that project perpendicularly or radially from the exterior of the cylinder. In the unit here shown, there may typically be five horizontal courses of tubes with twenty-seven circumferentially, making a total of one hundred and thirty-five tubes comprised of twenty-seven vertical rows of five in each row. Each tube carries a block 23 corresponding to block or bracket 4 in Fig. 1. Each block mounts a diode 24 corresponding to 3 of Figs. 1 and 2.

Vessel 20 has a closed bottom 20a to the outside of which positive D.C. bus connections 25 are integrated. At the top of the vessel 20 there is secured an insulating ring 26, and to this are secured three equal similar segmental and/or cover sections 27 which are insulated from each other as well as from the vessel 20, as indicated at 28. Each of these sections is of like construction and each forms a common conductor plate to which are secured radial conductors 29 that project beyond the sides of the vessel 20 and to the outer ends of each of which is connected a vertical strip 30, corresponding to the strip 12 of Figs. 1 and 2. These strips 30 are spaced from the walls of the vessel 20 and have their lower ends secured to an insulating annulus 31 at the bottom of the vessel 20. This annulus holds the conductor strips 30 in proper fixed relation, and mounts the assembly out of electrical contact with a supporting structure, such as a steel framework 32.

In the typical device here shown, each cover section has nine radial conductors 29 and vertical conductors 30, making twenty-seven in all, corresponding to the twenty-seven vertical banks of holes and tubes. Each of the three cover sections 27 has a separate connector 33 to provide connections for a three-phase A.C. current supply. The individual diodes are connected to the strips 30 in the manner shown in Figs. 1 and 2.

There is a circular pipe 34 under the insulating ring 31 from which rise manifolds 35 corresponding to 8 in Fig. 2, these in turn having tubes 36 leading to the individual blocks or brackets 23. Thus, each diode mounting is individually cooled and no water passes from one into another. There is an outlet tube 37 extending up to near the top of the vessel for the removal of fluid into a drain pipe 38. There may also be a drain 39 and a filling pipe 40.

The unit B is for the reverse side of the circuit. It is here shown with a cylindrical vessel made up of three segmental sections 41, 42 and 43 supported on an insulating ring 44 with insulation 45 between their confronting wall surfaces. Under the bottoms of these segmental sections, which are water-tight, there is a copper end member or plate 46 which is separated therefrom by the ring 44 and which has radial conductors 47 projecting therefrom over the top of the insulating annulus 44 which insulates the unit from the supporting frame, and which is similar to annulus 31 of unit A. Connected to each of the radial conductors 47 is a vertical conductor 48, which may correspond to 12 in Figs. 1 and 2. It will thus be seen that whereas unit A has three sets of vertical conductors, each set being electrically separate from the other and one vessel, unit B has all the vertical conductors connected together through plate 46, but has three separate vessels. Each segmental vessel has holes through its outer wall in which are secured metal tubes 47 as previously described, and each tube has a block or bracket 48 to support a diode 49. The same number of diodes are provided in units A and B, that is in the typical unit shown, three divisions of forty-five units each.

In section B fluid cooling is provided as in unit A, but for clarity of illustration these have not been shown. It will of course be apparent that insulated pipe connections would be used to electrically isolate the piping for each of the three vessels 41, 42, 43. Each of these vessels is provided with a connecting lug 41a, 42a and 43a for connection to the three legs of a three-phase A.C. current supply, and the plate 46 has negative D.C. connection 46a at the bottom.

Figure 4:
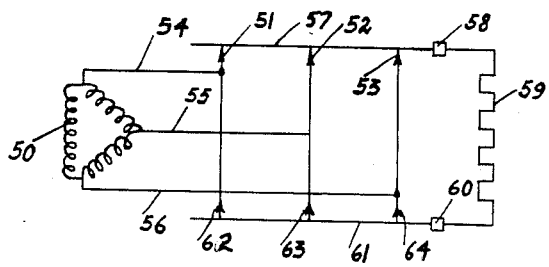
Fig. 4 is a typical schematic diagram for a three-phase rectifier utilizing the apparatus of Fig. 3.

Referring to Fig. 4, it shows how the apparatus of Fig. 3 is employed as a three-phase full wave bridge circuit rectifier. In this diagram the typical three-phase current supply is indicated at 50 in the conventional manner. Each arrow 51 corresponds to forty-five diodes in element A, each arrow 52 to an additional separate group of forty-five diodes, and arrows 53 to the third group of forty-five diodes in element A. Wire 54 represents the connectors to the first group of diodes, 55 the connectors to the second group, and 56 the connectors to the third group. The wire 57 represents the vessel 20, and 58 is the positive connector 25 of Fig. 3. The D.C. load is schematically represented at 59. At 60 in the diagram is represented the connector 46a on the bottom of plate 46, while wire 61 in Fig. 4 is the bottom plate 46 of Fig. 3, and 62, 63 and 64 represent the three separate groups of forty-five diodes on each of the vessels 41, 42, 43 of Fig. 3, which separate vessels are connected to the A.C. supply source.

My invention is unique in that by having the diodes carried on hollow tubes projecting normally to the wall of a vessel, fluid cooling may be provided while making each diode and its fuse accessible for replacement or repair. Each tubular support may introduce a predetermined element of impedance into each support capable of reducing to nearly equal value the load in any diode or group of diodes. As above indicated, the metal tube may be stainless steel, but it may be steel, iron, copper, nickel, or of an alloy. Alloys with a high coefficient of electrical resistance in most cases are more desirable where the diodes are in parallel. Sometimes combinations of two tubes, as iron for reactance and stainless steel for resistance may be employed. Additional correction can be made by wrapping a tube with insulated iron wire to obtain a drop across a diode that is overloaded. This is feasible, because the direct current in the tube is a pulsating direct current. It is thus possible to bring each unit to a maximum standard output.

Figure 5:
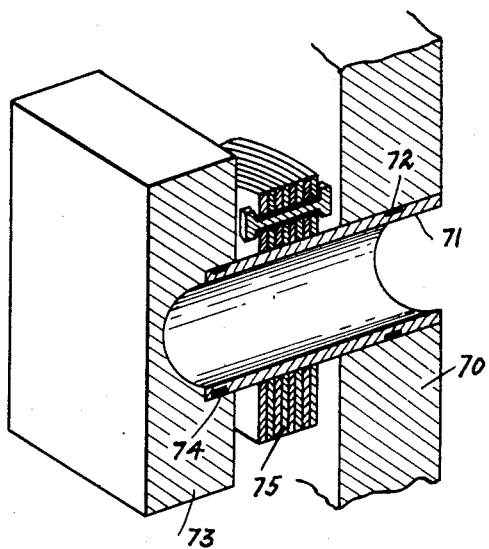
Fig. 5 is a perspective view showing further details of the mounting, and showing a reactive winding about the tubular mounting.

In Fig. 5 the vessel wall is designated 70. The tube 71 is fitted into the hole in the wall 70. It has an annular groove 72 filled with silver solder by which the tube is brazed into the vessel. The other end of the tube is fitted into a hole in the block 73 and is secured therein by a similar ring of silver solder 74. The block 73 is similar to the blocks heretofore described in the other views. This way of mounting the elements may be used in the other figures.

In this view I have shown a laminated iron annulus 75 around the tube, which, however, could be a wire coil. This is a reactance component in the circuit that will give a greater voltage drop with a given current than will the tube itself. Thus the tube is a resistance component and the annulus a reactance, giving combined impedance to overloading. If reactance alone is required, the tube may be copper with iron around it. The amount of iron on any tube may be adjusted for any particular unit depending upon the extent of voltage drop required.

In Fig. 3 have shown three segments for connection to the three A.C. supply lines. As an alternative the arrangement shown in Figs. 6 and 7 may be employed. Here there are three copper disks, but multiples of three may be used. They are spaced or insulated from one another and are designated from top to bottom as 80, 81 and 82. As shown in Fig. 7, these disks have holes arranged in radial rows of three at intervals around their peripheries. The bus bars 84, corresponding to bars 12 of Fig. 2, pass through these holes, and each bus bar is connected to one disk and not of electrical contact with the other two.

Thus if plate 80 is connected at point A to the three-phase transformer, 81 to point B, and 82 to point C, the bus bars may be variously arranged. In one position they may be in the order *a, b, c,* and at the next position around the unit in *b, c, a* order; next in *c, a, b,* order, etc. By thus interleaving the bus bars and changing their order, reactance, especially in units handling very high currents, can be reduced. The bus bars of course are connected to diodes supported in the manner described, and vertical spacing of the diodes for the respective bus bars is desirably attained, since only every fourth one vertically is connected to the same bus bar. Also, while I have shown one series of bus bars 34 for each vertical row, it will be seen that I may provide one series of bus bars for each two vertical rows, and thereby reduce the number of vertical bus bars and make access to the diodes more accessible.

One of the problems in multiple diode polyphase rectifiers is equalization of the load on the rectifiers due to the impedance in the long bus bars heretofore required, and the unequal impedance. Because of the compactness of a rectifier embodying my invention and the interlacing of the many branched circuits to the several groups of diodes, the overall impedance is greatly reduced and equalized.

Figure 10:
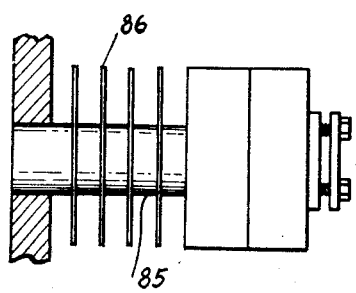
Fig. 10 is a fragmentary view of a diode mounting having air cooling fins.

With some units, air cooling will be adequate, in which case the supporting metal tubes, designated 85 in Fig. 10, and which correspond to the metal tubes previously described, may be provided with heat radiating fins 86.

Figure 8:
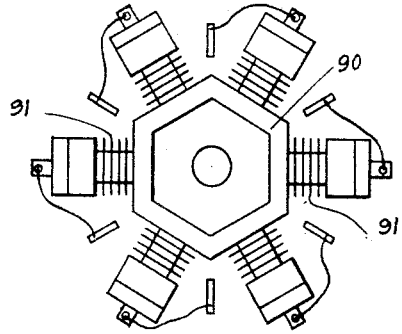
Fig. 8 is a plan view of a sectional unit which may be stacked with other units to provide for a wide variation of circuit arrangements from similar standard units.
Figure 9:
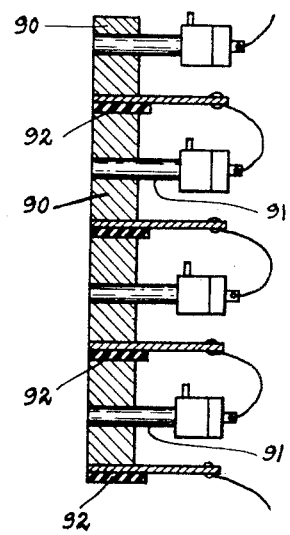
Fig. 9 is a fragmentary vertical section showing one such stacking arrangement.

In Figs. 8 and 9 I have shown how my invention may be embodied in standard units which may be assembled into units of various sizes and in various circuit arrangements. According to this construction, the metal shell is made up of a succession of rings or annuli which may be stacked one on another. Each annulus 90 has a plurality of the tubular diode mounting units 91 such as shown in Figs. 1 or 5 or 10 mounted thereon equidistantly about the periphery thereof. The annuli may be circular or polygonal, and are formed of metal having good conductivity.

Figure 6:
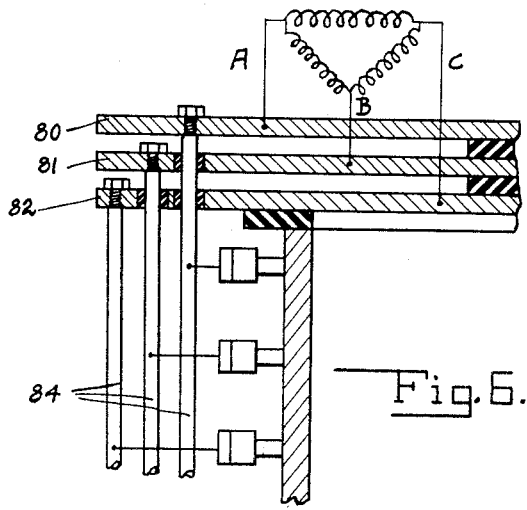
Fig. 6 is a fragmentary vertical sectional view of a modified construction.
Figure 7:
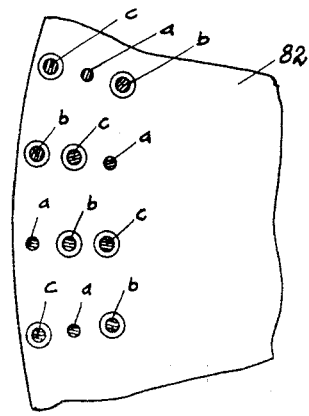
Fig. 7 is a plan view of the arrangement shown in Fig. 6.

To assemble a unit like the unit A in Fig. 3, one ring is placed upon another forming a continuous metal chamber, and may be clamped together and the units connected with a top arrangement as disclosed in Figs. 6 and 7. As shown in Fig. 9, one unit 90 may be placed upon another with an intervening layer of insulation 92. A conducting band at the bottom of each annulus is connected to the input of the diodes in the unit beneath. In this way all the units in each horizontal row are in parallel, but the succsesive horizontal rows are in series.

With sectional units of this type, they can be made up in advance and kept in stock and assembled to meet the needs of a particular user, so that it is not necessary to custom make a rectifier for each industrial purpose.

Figure 11:
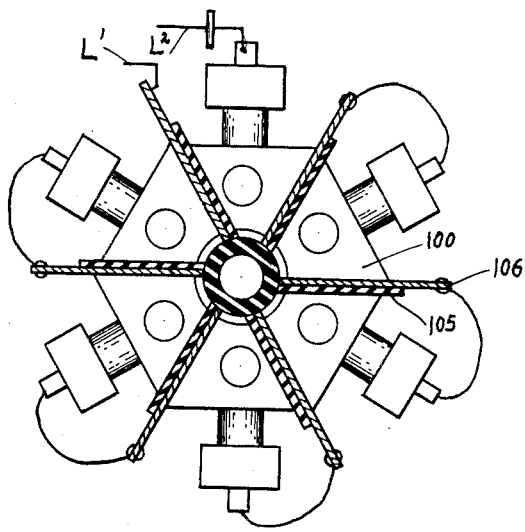
Fig. 11 is a horizontal section through another form of a rectifier assembly embodying my invention, wherein the column or center part of the assembly is made up of vertically divided sections, which may also be horizontally divided.
Figure 13:
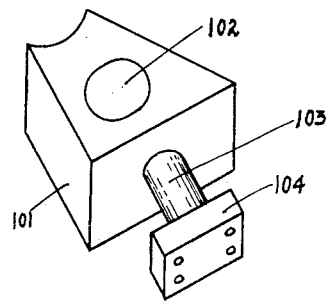
Fig. 13 is a perspective view showing one of the units from which the assembly of Figs. 11 and 12 may be made.
Figure 12:
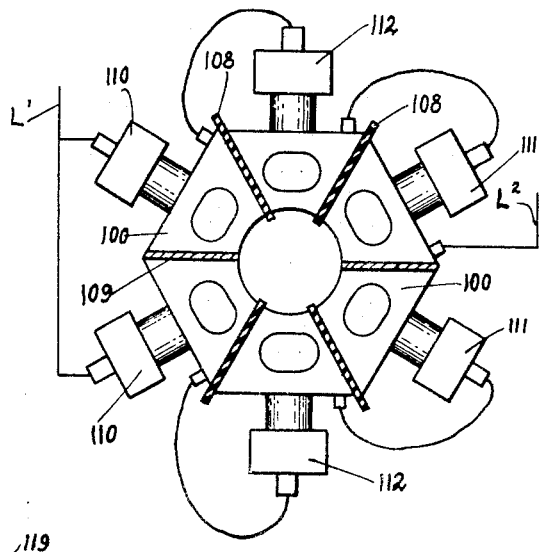
Fig. 12 is a view similar to Fig. 11 showing a different circuit arrangement for the diodes in this arrangement.

Referring to Figs. 11, 12 and 13, I have shown a rectifier construction in which the vessel or central column is made up of segments, and these segments may be divided horizontally as well as vertically if desired, by using individual units such as shown in Fig. 13. It may first be noted that in Fig. 3 the unit B shows one type of construction in which the vessel or central column is made up of segments insulated from one another, and Figs. 11 and 12 show how the central column may be divided into a greater number of segments to accommodate different circuit arrangements.

Referring first to Fig. 11, the central column is of generally hexagonal form, being comprised of a plurality of vertical segments 100 arranged in a symmetrical relation about a vertical axis. While the segments 100 could be solid from top to bottom, they may be formed of units as shown in Fig. 13 in which each segment is comprised of a plurality of standard blocks placed one upon another, these blocks being designated 101, and each block has a central passageway 102 extending vertically therethrough, and it has at its periphery a tube 103 carrying a diode-supporting block 104. In this way the diode-supporting blocks and tubes may be water-cooled as indicated in Fig. 1, while the blocks arranged in vertical columns form a continuous chamber for the cooling fluid by reason of the registering passages 102. The blocks 101 would be laid with a conducting sealing material between them, or with a non-conducting sealing material, depending upon the electrical characteristics of the assembly in which they are to be used. In Figs. 12 all of the blocks 101 in a column 100 are in conducting relation. However between each column and the adjacent one there is a vertical insulating strip 105, and against one face of this insulating strip and the column 100 there is a metal plate forming a common bus bar 106.

In the arrangement shown in Fig. 11, one lead from the alternating current source is connected to one of the plates 106 and is indicated $L^1$, while a bus bar is connected to the other lead $L^2$, and this in turn is connected to all of the diodes in one vertical column of the assembly. The other side of the diode of course is connected through the metal column 100 to the top or connecting strip 106, and this in turn is connected to the input of the rectifiers in the next column. In this way the rectifiers may be connected circumferentially in series while the horizontal courses are in parallel.

In the arrangement shown in Fig. 12 the unit is constructed the same as in Fig. 11, but the separator plates 108 are of insulating material, while the plates 109 which are put in merely to occupy space to make the structure symmetrical, are formed of metal. In this view one side of the alternating current circuit marked $L^1$ is connected to the rectifiers 110 which are at each side of one of the metal plates 109. Then the two opposite columns of rectifiers 111 are connected to the other side of the line $L^2$. The diodes designated 112 are then in series between 110 and 111, thus providing a divided circuit in which the rectifiers are in two groups, the groups being in parallel, while there are three vertical columns in series.

By varying circuit arrangements in this way, various voltages and currents can be secured from standard make-up parts, eliminating the building of multi-diode rectifiers as strictly custom-made units. Various features of the several figures, as the cooling manifolds, reactances, interleaving of bus bars, may be interchangeably used where desired, but for clarity of illustration have not been shown in all views.

Figure 14:
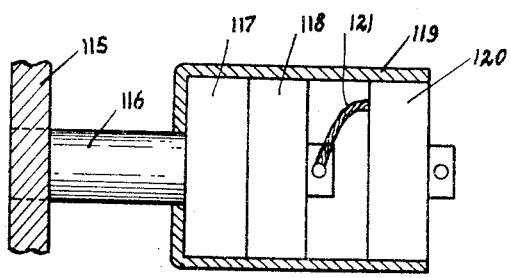
Fig. 14 is a view generally similar to Fig. 1 showing two diodes in tandem and connected in series at the outer end of a single supporting tube.

Also, where two diode units are to be used in series, as may be the case for example with germanium diodes where the applied voltage is too great to use a single diode, two diodes may be placed in tandem at the end of each supporting tube, as shown in Fig. 14, where 115 indicates a supporting vessel from which extends a tube 116 having a block 117 at its outer end, similar to Fig. 1, on which is a diode 118. An adapter 119 supports a second diode 120 in front of the first. A wire 121 connects the output of the diode 120 with the input of diode 118. This arrangement of tandem diodes can be used in the various assemblies described, and each tandem diode unit is accessible for service and the interleaving of circuits may be effected in the same way.

While I have shown and described certain specific structures, these are illustrative and the invention may be otherwise embodied within the scope of the following claims.

I claim:

1. A rectifier comprising a hollow vessel of conducting material, spaced tubes projecting perpendicularly from a wall of the vessel and opening into the interior of the vessel, a mounting block of conducting material at the outer end of each tube, and a diode mounted on each block and having one terminal connected to the block.

2. A rectifier as defined in claim 1 in which the tube constitutes an impedance between the block and the vessel.

3. A rectifier as defined in claim 1 in which the tube is inherently less conductive than the vessel to provide a resistance element between the diode and the vessel.

4. A rectifier as defined in claim 1 in which there is a reactance about the tube.

5. A rectifier as defined in claim 1 in which means are provided for circulating liquid through the vessel.

6. A rectifier as defined in claim 1 in which each tube has a connection for cooling fluid at its outer end, and means for removing fluid from the vessel.

7. A rectifier as defined in claim 1 in which the outer ends of the tubes are connected to liquid supply manifold, and means for withdrawing liquid from the upper part of the vessel.

8. In a rectifier, a direct current bus comprising a hollow vessel of conducting material, a plurality of tubes mounted on the walls of the vessel and projecting therefrom, the tubes opening into the interior of the vessel at their inner ends and each having a conducting terminal block at its outer end for mounting a diode, the tubes being of stainless steel.

9. In a rectifier, a direct current bus comprising a hollow vessel of conducting material, a plurality of tubes mounted on the walls of the vessel and projecting therefrom, the tubes opening into the interior of the vessel at their inner ends and each having a conducting terminal block at its outer end for mounting a diode, each block having a passageway leading from the exterior thereof to the outer end of the tube, and a nipple at the outer end of the passageway, the tubes being less conductive than the vessel.

10. A rectifier as defined in claim 1 in which the tubes are arranged in vertical rows, and there is a current supply strip extending vertically of the vessel in spaced relation thereto, one strip for each row of tubes, a diode mounted on each block, and a connector leading from the input terminal of each diode to the adjacent strip.

11. A rectifier for rectifying multi-phase alternating current comprising a vessel member and an end member which are electrically insulated from each other, one of said members being in three complemental sections which are also insulated from each other, the vessel member being generally cylindrical, a plurality of tubes projecting radially from the wall of the vessel member, the tubes opening into the vessel and being disposed in vertical rows, a metal block closing the outer end of each tube and providing a terminal and mounting for a diode, a diode on each block, the end member having a plurality of conductors projecting radially therefrom beyond the periphery of the vessel, and out of electrical contact therewith, a connector strip extending vertically from each conductor axially of the vessel and in spaced relation, there being one such strip for each vertical row of tubes, a connector leading from the input terminal of each diode to the nearest connecting strip, the member having three separate parts having a connector for connection with one phase leg of an alternating current supply.

12. A rectifier as defined in claim 11 in which the tubes have a cooling liquid supply connected thereto, the vessel having a liquid discharge pipe leading therefrom.

13. A rectifier as defined in claim 12 in which there is a vertical manifold for each row of tubes, the manifold having branches constituting the cooling liquid supply.

14. A rectifier as defined in claim 1 in which the vessel is made up of a plurality of similar sections.

15. A rectifier as defined in claim 14 in which the sections are insulated one from another.

16. A rectifier as defined in claim 1 in which the vessel is formed of a plurality of annuli stacked one upon another with a series of diode supports on each annulus.

17. A rectifier as defined in claim 16 in which the annuli are separated from one another by insulating rings.

18. A unit for use in constructing a rectifier utilizing a number of similar units, said unit comprising a hollow metal support, a plurality of metal tubes mounted on and projecting radially from the support, the tubes opening through the support, a mounting block on the outer end of each tube, and a diode on each mounting block with the tube constituting a conductor to the diode.

19. A rectifier mounting for use in multiple diode rectifiers comprising a metal tube, a diode mount at the outer end of the tube, and a sectional columnar vessel of conducting material, said tube being secured to one section of the vessel and projecting from the periphery thereof in a direction radial to the axis of the column.

20. A rectifier mounting for use in a multiple diode rectifier comprising a substantially wedge-shaped hollow body of metal which is complemental to other similar bodies forming a section of an annulus, a metal tube secured to the outer face of the body and leading to the interior of the body, and a diode-supporting member at the outer end of the tube.

21. A rectifier comprising a conducting columnar body comprised of a plurality of wedge-shaped sections, each section having a hollow chamber therein, insulating strips separating one section from another, a vertical row of metal tubes projecting from each section with the tube opening into the hollow interior of the section, a diode mounting block at the outer end of each tube, and a diode on each mounting block, the wedge-shaped section constituting a common conductor for all of the diodes supported by it.

References Cited in the file of this patent

UNITED STATES PATENTS

| | | |
|---|---|---|
| 2,143,919 | Kotterman | Jan. 17, 1939 |
| 2,169,109 | Muller | Aug. 8, 1939 |

FOREIGN PATENTS

| | | |
|---|---|---|
| 687,424 | Germany | Jan. 29, 1940 |